DEAD RECKONING INFORMATION PROCESSOR

Filed Feb. 14, 1961 8 Sheets-Sheet 1

INVENTORS
JERAULD G. WRIGHT
THOMAS C. DYKES
JOHN T. DALE
BY Smart & Biggar
ATTORNEYS.

INVENTORS
JERAULD G. WRIGHT
THOMAS C. DYKES
JOHN T. DALE

BY Smart & Biggar
ATTORNEYS.

Sept. 7, 1965 J. G. WRIGHT ETAL 3,205,346

DEAD RECKONING INFORMATION PROCESSOR

Filed Feb. 14, 1961 8 Sheets-Sheet 3

INVENTORS
JERAULD G. WRIGHT
THOMAS C. DYKES
JOHN T. DALE
BY Smart & Biggar
ATTORNEYS.

Sept. 7, 1965 J. G. WRIGHT ETAL 3,205,346

DEAD RECKONING INFORMATION PROCESSOR

Filed Feb. 14, 1961 8 Sheets-Sheet 4

INVENTORS
JERAULD G. WRIGHT
THOMAS C. DYKES
JOHN T. DALE
BY Smart & Biggar
ATTORNEYS.

Sept. 7, 1965 J. G. WRIGHT ETAL 3,205,346

DEAD RECKONING INFORMATION PROCESSOR

Filed Feb. 14, 1961 8 Sheets-Sheet 5

INVENTORS
JERAULD G. WRIGHT
THOMAS C. DYKES
JOHN T. DALE
BY Smart & Biggar
ATTORNEYS.

INVENTORS
JERAULD G. WRIGHT
THOMAS C. DYKES
JOHN T. DALE
BY Smart & Biggar
ATTORNEYS.

DEAD RECKONING INFORMATION PROCESSOR

Filed Feb. 14, 1961 8 Sheets-Sheet 7

INVENTORS
JERAULD G. WRIGHT
THOMAS C. DYKES
JOHN T. DALE
BY Smart & Biggar
ATTORNEYS.

DEAD RECKONING INFORMATION PROCESSOR

INVENTORS
JERAULD G. WRIGHT
THOMAS C. DYKES
JOHN T. DALE
BY Smart & Biggar
ATTORNEYS

3,205,346
DEAD RECKONING INFORMATION PROCESSOR

Jerauld George Wright, Dartmouth, Nova Scotia, and Thomas C. Dykes and John T. Dale, Ottawa, Ontario, Canada, assignors, by direct and mesne assignments, to Her Majesty the Queen in right of Canada as represented by the Minister of National Defence, Ottawa, Ontario, Canada Filed Feb. 14, 1961, Ser. No. 89,150
Claims priority, application Canada, Feb. 15, 1960, 792,520
3 Claims. (Cl. 235—187)

Figure 1A:
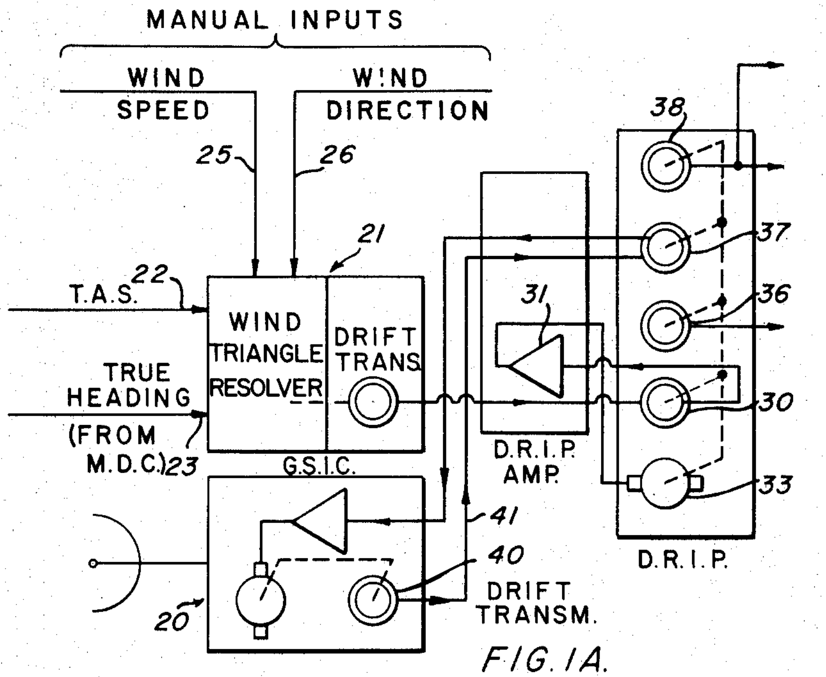

This invention relates to apparatus for processing aircraft navigational information and more specifically to a device which processes available navigational data and produces information whereby an aircraft position in latitude and longitude may be determined.

It is an object of the present invention to provide apparatus capable of accepting navigational data such as aircraft draft, true heading and distance travelled over the ground by the aircraft from a variety of information sources and processing that information so that the aircraft navigator may be provided with information from which a dead reckoned position in terms of latitude and longitude may be produced.

It is a further object of the present invention to provide an accurate and versatile computer which processes accepted data in a novel manner.

According to the present invention apparatus for processing aircraft navigational information comprises first resolving means; means for setting into said resolving means as first and second inputs thereto the analogue of aircraft true track and the analogue of ground miles travelled along aircraft track; sine and cosine output means for said first resolving means adapted to take-off in analogue form sine and cosine functions of the resolution; second resolving means; means for setting into said second resolving means as first and second inputs thereto the sine and cosine resolution analogues from the first resolving means; and output means for said second resolving means adapted to take-off respectively therefrom the analogue of change in longitude and the analogue of change in convergency of meridians.

According to a preferred embodiment of the present invention apparatus for processing aircraft navigational information comprises a first ball resolver; angular and linear input shafts to the ball resolver adapted to apply respectively the analogues of aircraft true track and ground miles travelled along the aircraft track; sine and cosine output shafts for said resolver adapted to take-off respectively the analogues of "east-west miles" and "north-south miles" components of ground miles travelled; a second ball resolver; angular input shaft means for applying as an input the said "north-south miles" component to said second ball resolver, the cosine output shaft of the ball resolver being adapted as an input shaft means to apply to said second ball resolver the analogue of the said "east-west miles" co-ordinate component; the sine output shaft taking off from said ball resolver the analogue of change in convergency and the linear input shaft of said ball resolver being adapted to transmit as an output from the ball resolver the analogue of change in longitude.

According to a feature of the invention servo drive means are provided for the longitude analogue output shaft of the second ball resolver, which servo drive means are adapted to drive said shaft in response to an error signal derived from the angular difference between the said "east-west miles" component input shaft and the sine output shaft of the first ball resolver.

According to a further feature of the invention the apparatus is adapted to receive information relating to wind speed and direction and ground speed travelled from either a Doppler radar or a mechanical wind triangle solver of the type described in the Wright et al. Canadian Letters Patent No. 582,382, dated September 1, 1959.

In accordance with a feature of the invention the outputs from the Doppler radar and from the mechanical wind slaving triangle are arranged so that these instruments are slaved to each other.

It is yet a further feature of the invention to provide a memory device for storing analogue information comprising: an output shaft, a first gear wheel on said shaft and pinion gear meshing with first mentioned gear, a second gear wheel independently mounted for rotation in mating engagement with said pinion gear, the number of teeth of said first and second gears being the ratio $n:n+1$; and means associated with said gear wheels for indicating when said memory device is clear.

The present invention also provides sensing devices operable on crossing a datum point, namely the equator or the international date line, or the Greenwich meridian to indicate in which hemisphere the aircraft is flying.

Figure 1B:
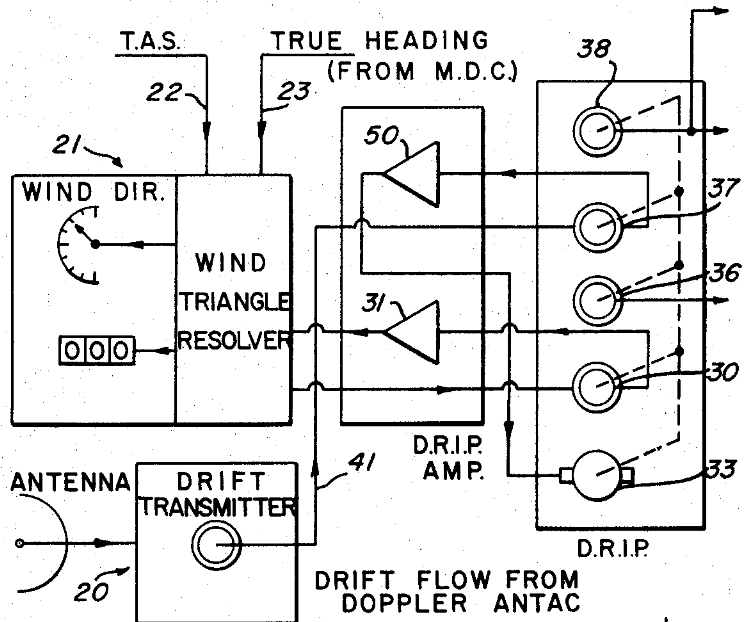
Figure 2B:
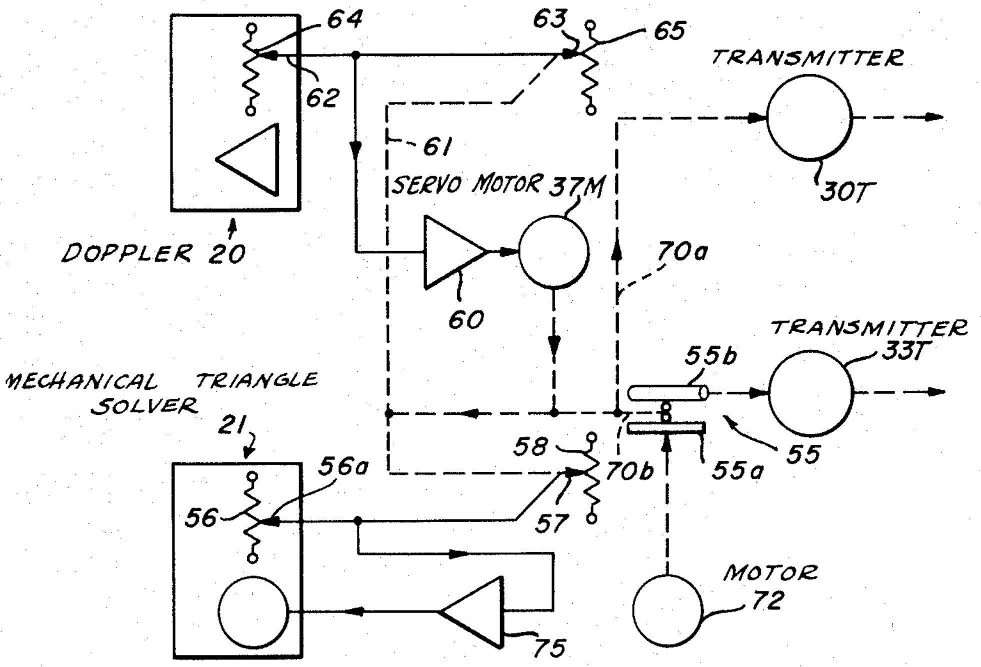
Figure 2A:
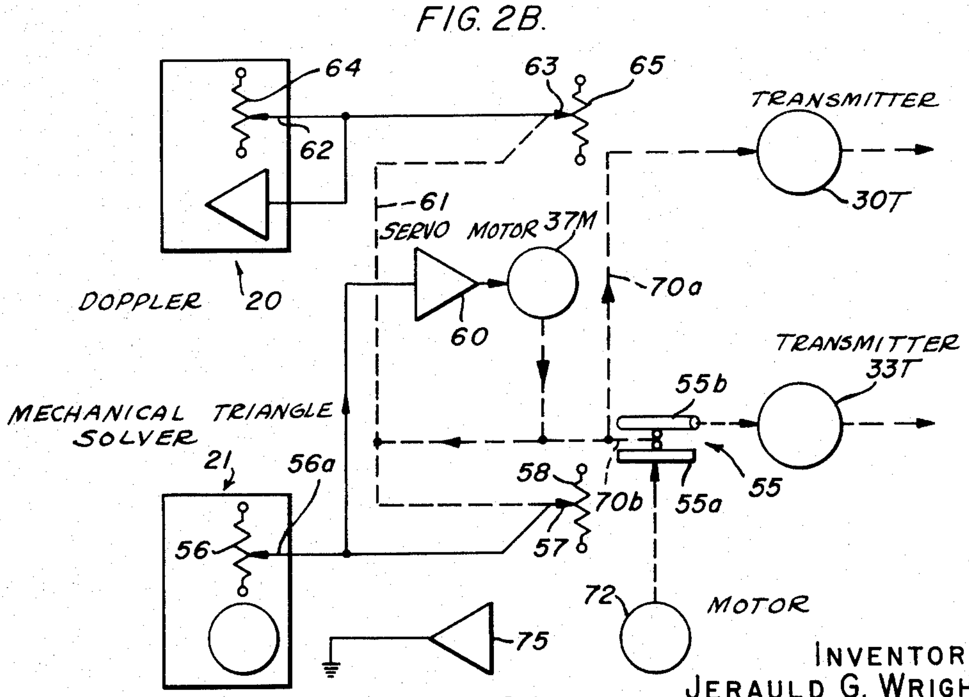
Figure 3:
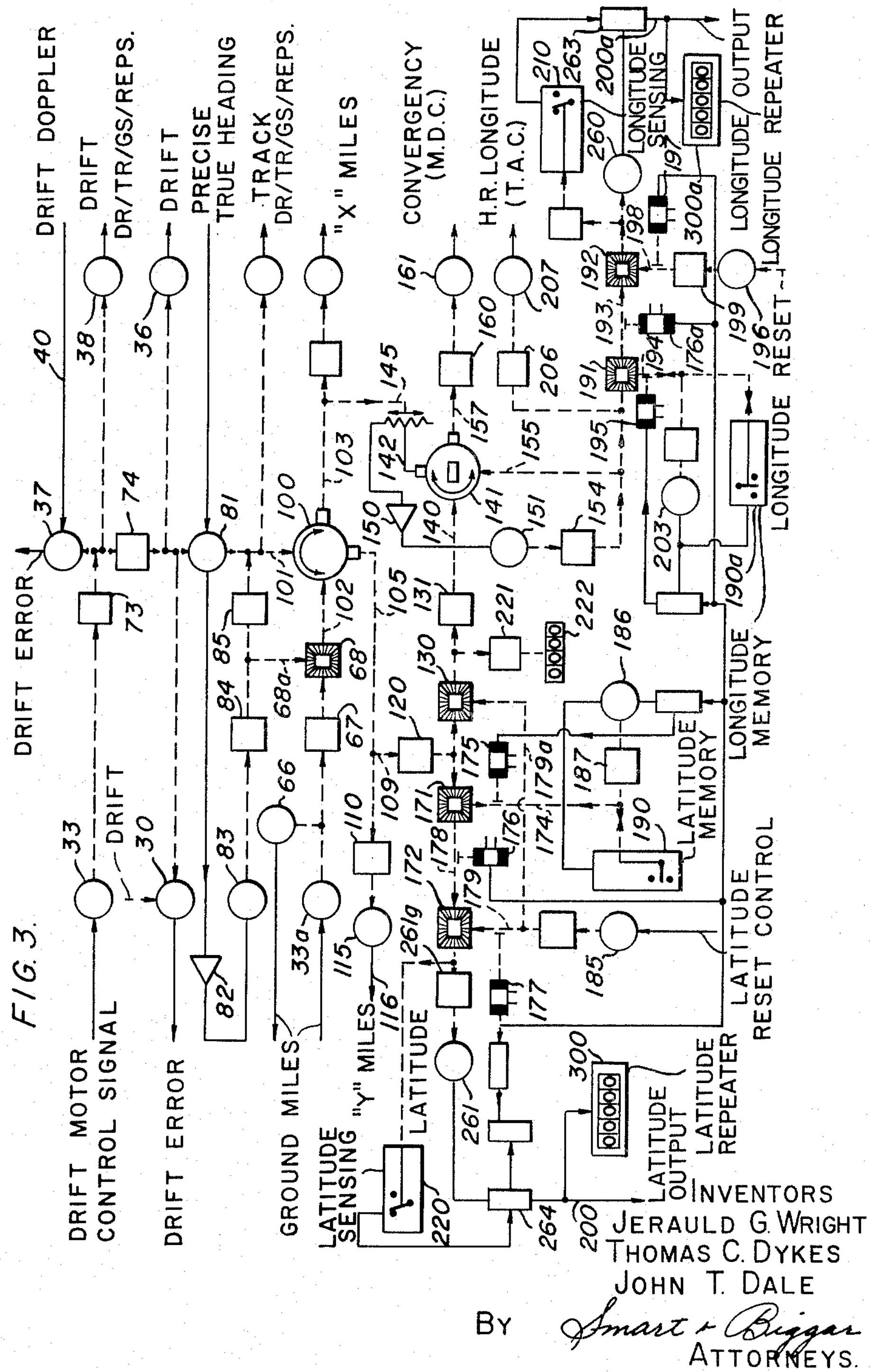
Figure 4:
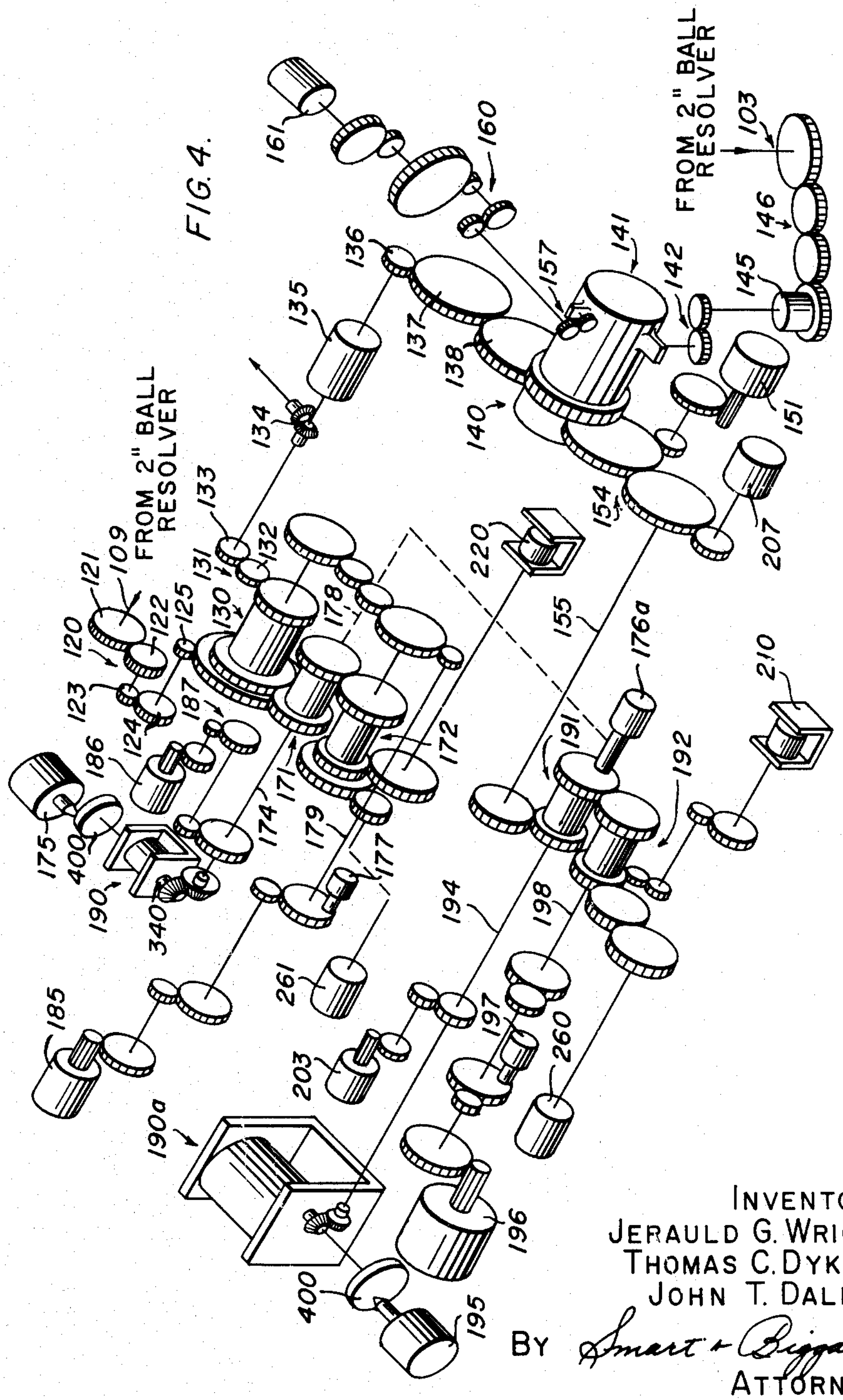
Figure 5:
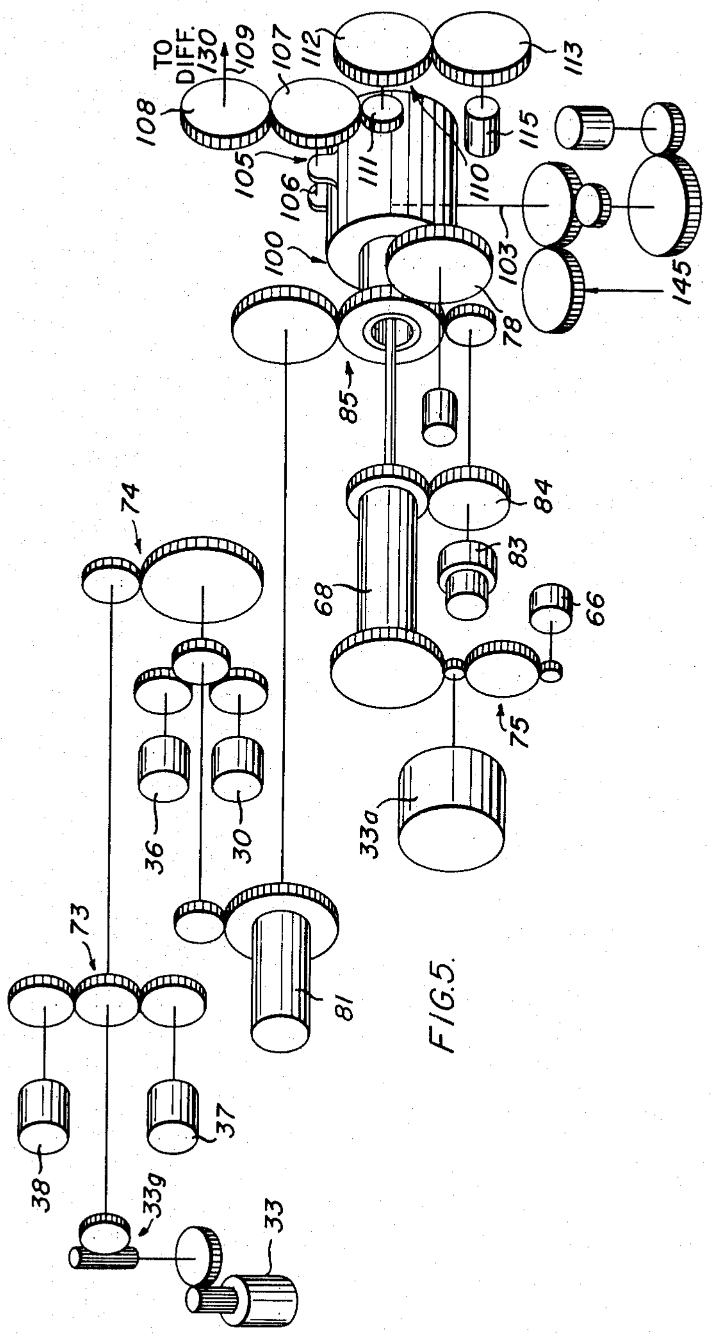
Figure 6:
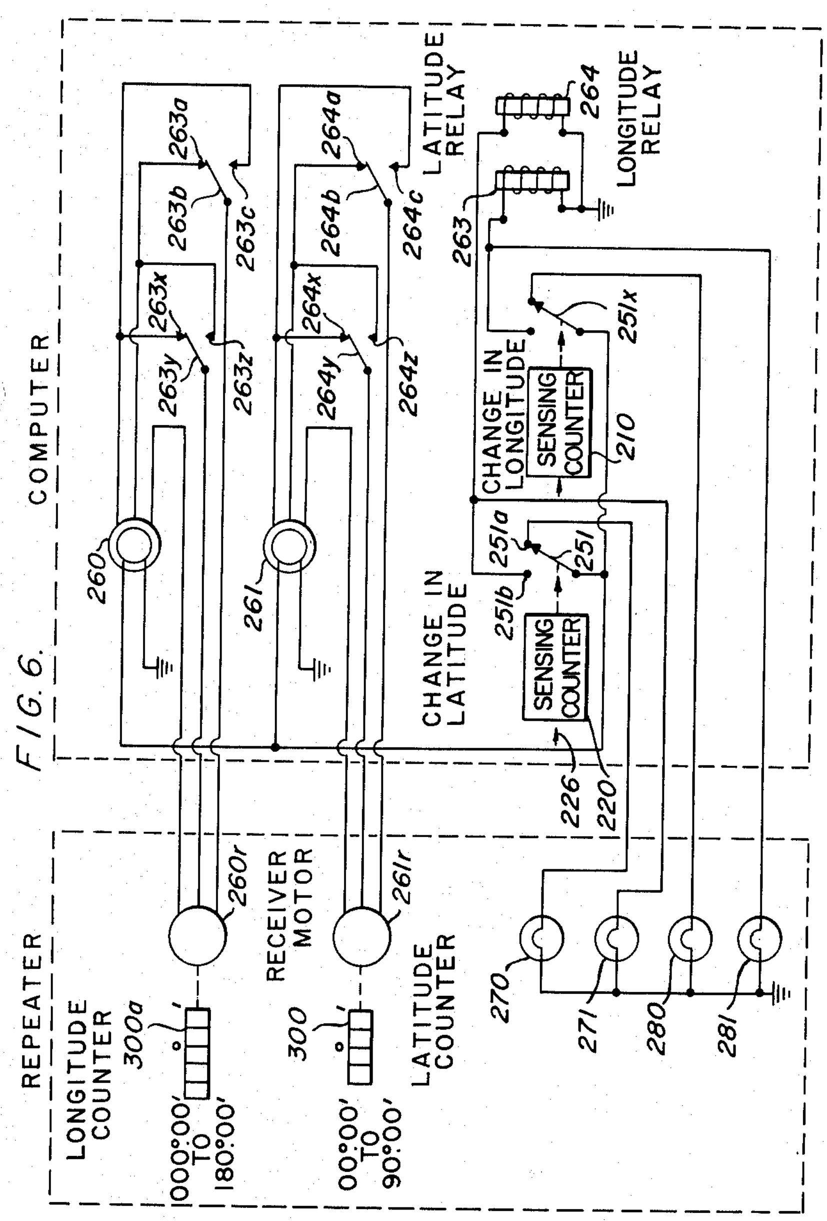
Figure 7:
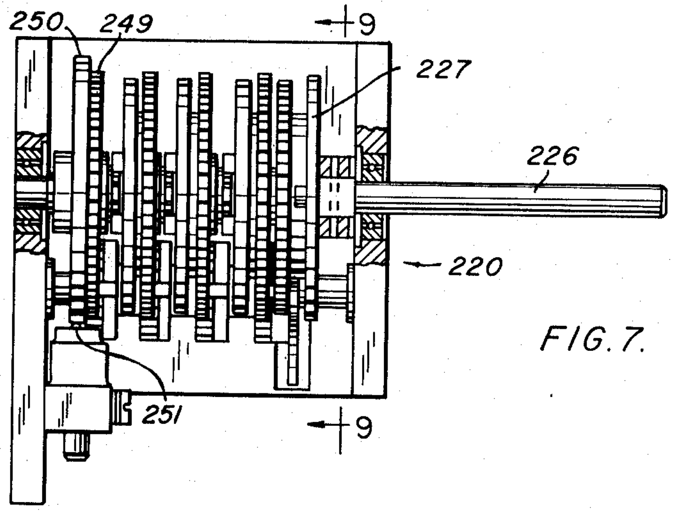
Figures 8, 8A, 8B, 9, 9A:
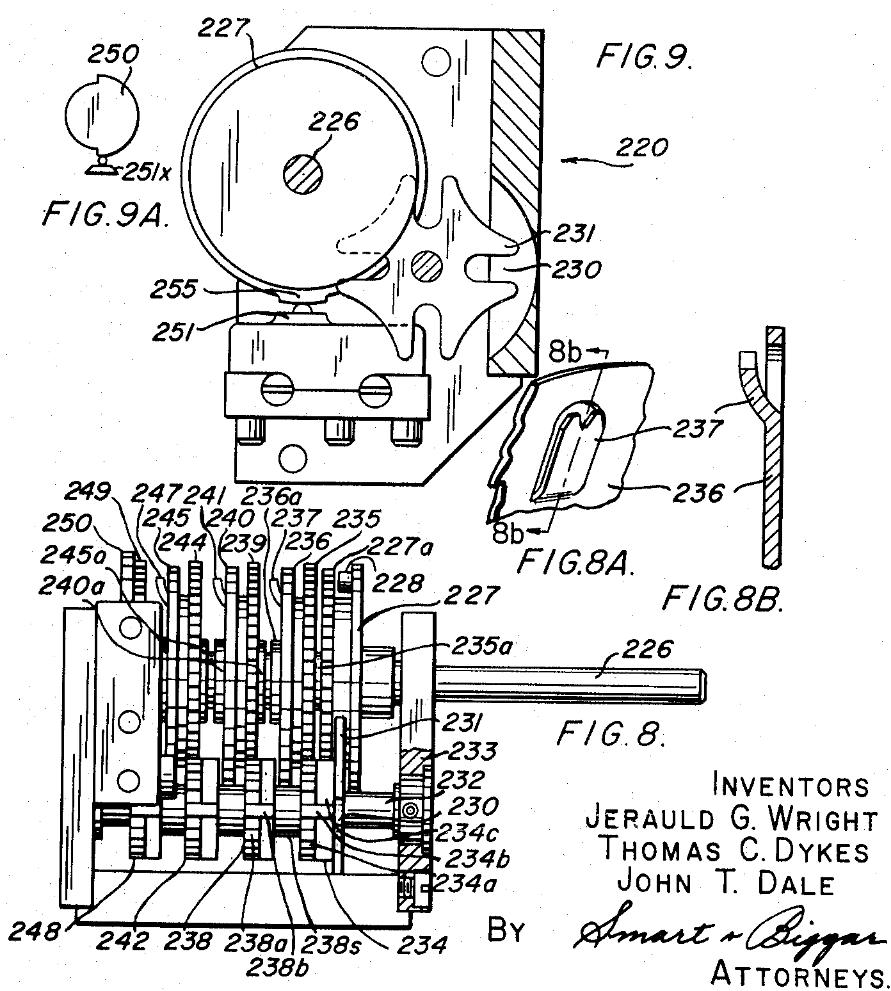
Figure 11:
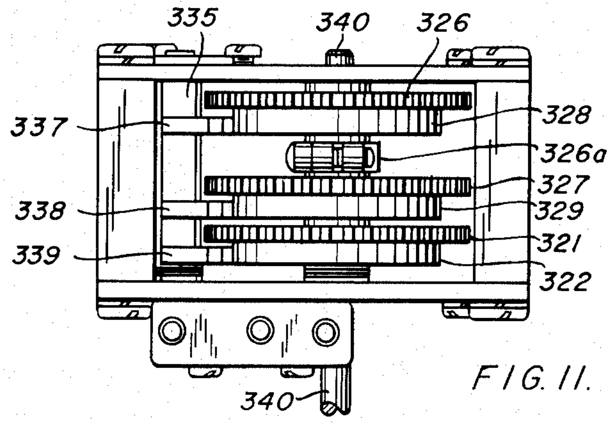
Figures 10, 12A:
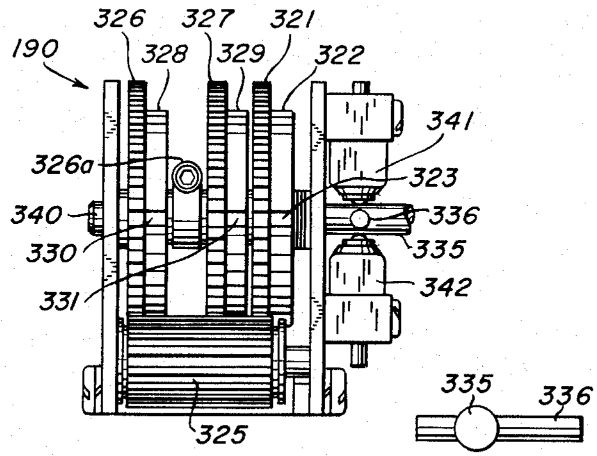
Figure 12:
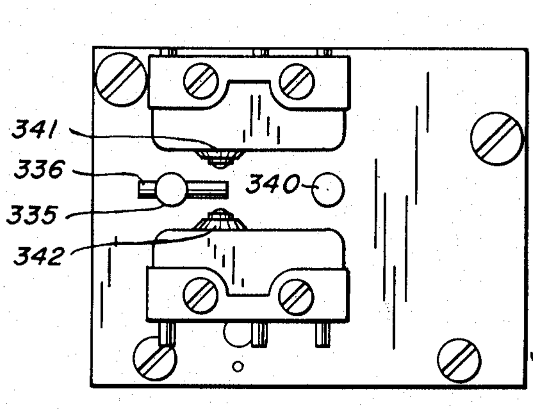

The following is a description by way of example of one embodiment of the present invention, reference being made to the accompanying drawings in which:

FIGURES 1A and 1B show diagrammatically the slaving and servo arrangement of a Doppler drift finding device and a mechanical triangle solver, FIGURES 2A and 2B show diagrammatically the slaving of a Doppler ground speed device and a mechanical triangle solver and an integrator associated therewith, FIGURE 3 is a schematic layout of a computer in accordance with the present invention, FIGURE 4 is a schematic representation of the latitude-longitude section of the computer, FIGURE 5 is a schematic representation of the "north-south" "east-west" miles section of the computer, FIGURE 6 is a diagrammatic representation of the electrical connections of change-over sensing circuits for the present invention, FIGURE 7 is an elevation partially in section of the sensing counter mechanism, FIGURE 8 is a plan view of the device of FIGURE 7, FIGURE 8A is a detail, FIGURE 8B is a section on the line 8*b*, 8*b* of FIGURE 8A, FIGURE 9 is a section on the lines 9—9 of FIGURE 7 looking in the direction of the arrows, FIGURE 9A is a detail of a cam used in a longitude sensing device in accordance with the invention, FIGURE 10 is an elevational view of the memory device in accordance with this invention, certain parts being omitted for the sake of clarity, FIGURE 11 is a plan view of the element illustrated in FIGURE 10, and FIGURES 12 and 12A are details of the microswitch associated with the memory device of FIGURES 10 and 11.

Such data as aircraft true air speed, aircraft true heading, wind speed and wind direction, is utilized to obtain outputs of true track and ground miles travelled by the aircraft. FIGURES 1A and 1B show the link-up on a Dopple radar instrument with a mechanical triangle solver such as for example that described in the Wright et al. Canadian Patent No. 582,382. FIGURES 2A and 2B illustrate the utilization of the information obtained from the Doppler radar and a mechanical triangle solver in an integrator to obtain ground miles travelled.

Referring to FIGURES 1A and 1B, in FIGURE 1A the Doppler radar instrument 20 is considered to be inactive. A mechanical triangle solver is ilustrated diagrammatically at 21. This triangle is supplied with inputs of analogues of true air speed, shown diagrammatically at 22 and true heading as shown diagrammatically at 23. The true air speed input analogue can be obtained from any conventional true air speed instrument and the true heading analogue is similarly obtained from some remote source such as for example the instrument described in United States Patent No. 3,062,437 issued to Jerauld George Wright. In this instance a mechanical triangle solver 21 is utilized as a wind triangle solver ad analogue information with regard to wind speed and wind direction is manually fed into the instrument by the navigator as shown diagrammatically as at 25–26. The solution obtained in the wind triangle resolver is the analogue of aircraft drift. Now this information is applied as an electrical analogue signal to control transformer 30. The control transformer analogue signal is amplified in amplifier 31 and applied to servo motor 33 which is mechanically connected to synchro transmitters 36 and 38 and control transformers 30 and 37. Control transformer 37 acts to slave the Doppler 20 by its servo system 40 to bring the output from the Droppler 20 on line 41 into agreement with the output of the mechanical triangle solver 21 to the control transformer 30. An output from the synchro transmitter 38 (an electrical analogue of drift) may be fed to a drift repeater at a remote point in the output from the synchro transmitter 36 again, an electrical analogue of drift, may be applied to such instruments as pilot drift repeaters or the like or to an instrument such as that described in the Wright application Serial No. 88,906, filed February 13, 1961.

In FIGURE 1B there is shown the situation where the Doppler is active. In this mode of operation the wind triangle solver 21 is used as a memory device for the Doppler system 20. The output signal on line 41 of the Doppler 20 is applied to control transformer 37, amplified in amplifier 50 and applied to motor 33. The mechanical connection between motor 33, control transformer 30, transmitter 36, control transformer 37 and transmitter 38, enables the signals to be sent from transmitters 38 and 36 as before, this corrects the error signal on control transformer 37, enables the outputs from synchro transmitters 36, 38 to be as previously described, and also applies, through control transformer 30, a signal which is amplified in amplifier 31, and is applied to wind triangle solver 21 to slave this instrument so that its drift angle information is maintained in agreement with Doppler drift angle and thus may be used as a drift angle memory in the event of Doppler failure.

FIGURE 2A illustrates the utilization of the Doppler device 20 and the triangle solver 21 to produce an output analogue of ground speed which is integrated in a ball and disc integrator 55 and transmitted therefrom as an analogue of ground miles travelled. Here again the Doppler device 20 and the mechanical triangle solver 21 are slaved to each other. It is assumed for the purpose of describing the embodiment shown in FIGURE 2A that the signal being received by the Doppler 20 is such that the Doppler has no output, that is to say the Doppler radar is inactive. The analogue of ground speed in this mode of operation, is taken from the mechanical triangle solver instrument 21. The wiper position of sliding potentiometer 56 within the instrument is compared with the position of the wiper 57 on a potentiometer 58 and an electrical error signal is produced. This is amplified in amplifier 60. At the same time the wiper 63 of potentiometer 65 is positioned by positioning arm 61 to agree with the ground speed analogue as indicated by the triangle solver 21. The wiper position of potentiometer 65 is electrically compared with the wiper position of potentiometer 64 and an electrical error signal is derived and transmitted to the Doppler radar whereby to align the wiper of potentiometer 64 thus providing a ground speed reference analogue in the Doppler. A mechanical take-off of the analogue of ground speed is illustrated diagrammatically at 70*a*, which analogue is applied as a shaft rotation to the transmitter 30T from whence it is transmitted in a step-by-step form as an electrical analogue of ground speed for use on some further navigational instrument in the aircraft which requires an input analogue of ground speed. The integrator 55 has a disc 55*a*, which is driven at a constant speed by motor 72. The input shaft 70*b* of the integrator positions the ball carriage of the integrator in response to the output analogue from servo motor 37M. Thus the output roller 55*b* of the integrator is driven to provide an output analogue of ground miles travelled which is applied as a shaft rotation to the step-by-step transmitter 33T for use in the ball resolver 100 to be described hereinafter with reference to FIGURE 3.

FIGURE 2B shows how the elements of FIGURE 2A are utilized to give ground speed output when the Doppler device is active, that is to say when it is receiving a signal of sufficient strength to enable it to have an output. In this instance the position of the wiper 62 on the potentiometer 64 is compared with the wiper 63 of the potentiometer 65. The error signal thus originating is amplified in amplifier 60, and applied to the motor 37M, which transmits outputs to the inegrator 55, the transmitter 30T, and mechanically slaves the wiper 57 of the potentiometer 58. The electrical error signal between the wipers 56A and 57 is amplified in amplifier 75 and applied to a motor in the mechanical triangle solver 21, whence the wiper 56A of its potentiometer is brought into line with the position of the wiper 57. As before, the transmitter 30T and 33T transmits as a shaft rotation the analogues of ground speed and ground miles travelled respectively.

Referring now more particularly to FIGURES 3 and 5. The upper portion of FIGURE 3 illustrates schematically the arrangement of the motor 33, synchro transmitters 36, 38 and control transformer 37 of FIGURES 1A and 1B. The lower portion of FIGURE 3 illustrates the latitude and longitude computing section of a device according to the invention, and FIGURE 5 diagrammatically illustrates the mechanical elements illustrated in the upper portion of FIGURE 3.

The motor 33 is driven in accordance with the signal received from the Doppler radar 20 or the mechanical triangle solving mechanism 21, as previously described, and positions through gearing, generally indicated as 33*g*, (FIGURE 5) and gearing 73, the shafts of synchro transmitter 38 and control transformer 37, and through gearing 74, the casing of an electro mechanical differential 81. Thus the differential 81 has a first input of the analogue of drift angle from motor 33. A second input to the differential 81 is in the form of an electrical analogue signal of precise true aircraft heading. This second analogue is obtained from another instrument in the aircraft capable of generating an electrical analogue of precise true heading. Such an instrument is described in United States Patent No. 3,062,437. The differential 81 generates an electrical error signal which is amplified in amplifier 82 (FIGURE 3) and applied to the servo motor 83 which through gear 84 applies an analogue signal of the track made good by the aircraft to one side of mechanical differential 68 and through gearing 85 to the ball resolver 100.

The electrical analogue input of ground miles travelled is received by the step-by-step motor 33*a* and applied therefrom as a shaft rotation to a step-by-step transmitter 66 whence it is transmitted for use in a further computer elsewhere in the aircraft, such a computer as described in United States Patent No. 3,080,117. The output analogue from the step-by-step motor 33*a* is also transmitted to a gear box 67 and to the differential 68. On the difference shaft 68*a* of the differential there is applied an analogue signal track from the gear box 84. This arrangement removes false inputs of ground miles caused by changes of track. Thus the resulting output from the differential 68 and on the shaft 102 is the analogue of ground miles travelled by the aircraft. This analogue is applied to the linear input shaft of the ball resolver 100.

The ball resolver 100 is a standard 2″ diameter resolver with angular and linear input shafts, 101 and 102 respectively, and sine and cosine output shafts 103 and 105 respectively. As described, the analogue of aircraft true track (as a shaft rotation) is applied to the angular input shaft 101 as a first input to the ball resolver and the analogue of ground miles travelled along aircraft track is applied in the form of a shaft rotation as a second input to the ball resolver on the linear input shaft 102. Thus the sine and cosine output shafts 103 and 105 respectively of the resolver resolve therefrom what could be termed analogues of "X" and "Y" coordinates or more specifically an analogue of a component of "East-West" ground miles travelled and an analogue of a component of "North-South" ground miles travelled. Both the last mentioned analogues are expressed in the form of a shaft rotation. It will be appreciated that the "Y" coordinate analogue is also equivalent to the analogue of change in latitude. The shaft diagrammatically illustrated as 105 in FIGURE 3 actually comprises a shaft 106 and an integral gear 107 (FIGURE 5). The shaft 106 and gear 107 is rotated in accordance with the analogue value of the component of "North-South" ground miles travelled resolved from the ball resolver 100. Meshing with the gear 107 is a gear 111 of the gear box 110 which comprises the gear train 111, 112 and 113. The gear 113 provides the mechanical analogue input of "North-South" miles travelled to a step-by-step transmitter 115 which converts the analogue information input into an equivalent electrical analogue and transmits a signal through electrical connections 116 (FIGURE 3) to any other navigational aid in the aircraft which may require an input of an analogue of "North-South" miles travelled along a track by the aircraft. Also meshing with the gear 107 is a gear 108 on a shaft 109 which is connected, through a gear box 120 (FIGURE 4) comprising a gear train 121, 122, 123, 124, 125, with a differential 130. In this manner the mechanical analogue of "North-South" miles component from the ball resolver 100 is transmitted to the differential 130 and thence through gear box 131 which comprises gears 132, 133, cone gear 134, a reduction gear box 135 (in this instance a 360/1 reduction) and gears 136, 137, 138 to the angular input shaft means 140 of a second ball resolver 141.

The second ball resolver 141 is a standard 1″ diameter ball resolver having angular input shaft means 140, linear input shaft 155, sine output shaft means 157 and cosine output shaft means 142. The cosine output shaft means 142 of the second ball resolver 141 is connected to the sine output means 103 of the first ball resolver 100 through a differential potentiometer 145 and gear train 146 (FIGURE 4), thus the normal cosine output shaft means of the ball resolver 141 is adapted as an input shaft means to apply to the second ball resolver 141, the analogue of the "East-West" miles component from the sine output shaft means 103 from the first ball resolver 100. Furthermore the normal linear input shaft 155 of the second ball resolver 141 is adapted as an output shaft.

Referring particularly to FIGURE 3 it will be noted that an electrical error signal is derived at the potentiometer 145 from the angular difference between the shaft means 142 and the sine output shaft means 103 of the first ball resolver 100. This error signal is amplified in amplifier 150, and applied to the motor 151 whereby the motor drives the shaft 155 through a gear box 154. The apparatus of this unobvious adaptation of a normal ball resolver plus the servo assistance for the shaft 155 enables the computer to be utilized effectively in polar regions. With the particular arrangement just described the computer of the present invention operates accurately to latitudes of 88 degrees 30 minutes North.

Since meridians which intersect the equator at right angles converge towards each other and meet at geographical poles they cannot, for purposes of Arctic navigation, be considered as parallel lines. The meridians do indeed converge in accordance with the formula: change in longitude multiplied by sine of latitude.

It will be seen from the configuration of the ball resolver 141 and the manner in which the data is applied thereto that the sine output shaft means 157 of the ball resolver 141 will take off as a shaft rotation the analogue of change in convergency of meridians, and this information is transmitted through a gear box 160 to a step-by-step transmitter 161 and thence to a navigational instrument capable of making use of this data. Such an instrument is described and claimed in the United States Patent No. 3,062,437.

The analogues of change in latitude and change in longitude from shafts 105 and 155 are transmitted as electrical analogues by step-by-step transmitters 261, 207 on electrical conductors 200 and **200*a*** to remote counters whereby the navigator may, at a glance, determine his dead reckoned position in terms of latitude and longitude.

It will be appreciated that from time to time it becomes necessary to correct the dead reckoned position of latitude and longitude since certain errors may arise in the sources of information. For example, the wind information and ground miles information fed into the computer will have an accuracy of less than 100% and thus over a period of time an error will result in the computed data. To offset this the navigator will, where he is able, make position fixing sights on celestial bodies or will have recourse to a beacon or other navigational aid. Now while the computed latitude and longitude is being corrected the aircraft is not stationary, thus the computer, if stopped and corrected, would give a false reading after the correction has been made. To this end the present invention provides a memory device to store data of changes in latitude and for the longitude whilst the correction is being effected.

When the equator or the international date line is crossed the latitude section of the computer will pass through zero and the longitude computer will need to reverse from east to west or vice versa. Therefore there has been provided in the present invention sensing counters which enable the latitude and longitude sections of the computer to take care of this passing of the datum point. During a transpolar flight the heading of the aircraft will change from north to south as the pole is crossed and the input information to the latitude section of the computer will be reversed.

*The sensing circuit*

FIGURES 6, 7, 8, 9 and 9*a* show the electrical and mechanical arrangement of the sensing devices 210, 220. These devices are identical, save for the shape of the cam 250. FIGURE 9 illustrates the cam for the latitude sensing device with a single riser 255 and FIGURE 9A illustrates the cam of the longitude sensing device having 180° raised portion and 180° lowered portion. The latitude sensing device is described hereunder in detail.

The analogue of north-south miles is applied to the sensing device as a shaft rotation on shaft 226. Fixed to the shaft 226 is a wheel 227 on which is located a pin 228. One complete revolution of the shaft 226 causes the pin to engage any one of the slots 230 of a Geneva wheel 231 which is mounted on a shaft 232 in the casing 233 of the sensing counter. The engagement and actuation of the Geneva wheel causes it to rotate a quarter of a revolution for one complete revolution of the wheel 227. The Geneva wheel 231 is compounded with a pinion gear 234 having alternate short and long teeth **234*a*, 234*b* respectively. The space 234*c* provided between the short tooth 234*a* and the Geneva wheel 231 is such that the portion 227*a* of the wheel 227 is engaged on its periphery at any single time by one long tooth 234*b* only. This point contact reduces any tendency to slip off the wheel 227. The arrangement of the teeth 234***a*, 234*b* of the compound wheel 234 is such that a quarter revolution of the Geneva wheel 231 is sufficient to cause the pinion 234 to engage with the geared portion 235 of a wheel 236 and cause the wheel 236 to move one movement of a revolution, say one-tenth of a revolution. The wheel 236 is mounted coaxially of wheel 227 on bearing 236*a* and is separated therefrom by a spacer 235*a*. Thus one complete revolution of the wheel 227 causes one-tenth of a revolution of the wheel 236 and ten revolutions of the wheel 227 causes one complete revolution of the wheel 236. The wheel 236 is provided with a projection 237 having one tooth (FIGURES 8A and 8B), which projection engages with the teeth 238*a* and 238*b* of a geared pinion wheel 238 and causes it to rotate a fraction, say one-tenth of a revolution. The wheel 238 is mounted coaxial with but independent of, pinion 234 and spaced therefrom by spacer 238*s*. In its turn the pinion 238 meshes with the geared portion 239 of a wheel 240 mounted in bearings 240*a* on shaft 226. One complete revolution of the wheel 236 causes, say, one tenth of a revolution of the wheel 240 and this would be equivalent to one hundred revolutions of the wheel 227. In like manner the wheel 240 has a single toothed projection 241 which engages a pinion 242 whereby to rotate the wheel 245 mounted in bearings 245*a* by engaging its geared portion 244. Ten revolutions of the wheel 240 causes one revolution of the wheel 245. A single toothed projection 247 on the wheel 245 engages with gear 248 which in turn meshes with gear 249; ten revolutions of the wheel 245 causing one complete revolution of the gear 249. Integral with the gear 249 is a cam 250, the riser 255 of which operates a microswitch 251 for a purpose which will be described when the necessary number of revolutions have been imparted to the shaft 226.

FIGURE 9 shows the cam 250 of the latitude sensing counter. Associated gearing, on the input shaft 226, ensures that the correct number of revolutions are imparted to the counter to cause the cam to operate when the equator is crossed. That is to say the correct summation of revolutions has been imparted to the sensing device when the zero line of latitude is passed so that the riser 255 on the cam 250 actuates the switch 251. It will be appreciated that due to the fact that the initial drive is through the Geneva wheel 231 the riser 255 of the cam 250 does not gradually contact the switch 251 but there is an actual step immediately the correct number of rotations have been imparted by the shaft 226. In this manner the switch is operated through one brief quarter turn of the Geneva wheel.

In FIGURE 9A there is shown the longitude sensing device cam. The requirement here, as will become apparent, is that the microswitch 251*x* will be closed whilst the aircraft is travelling between zero and 180° East and having passed the international date line will be open. To this end the cam of the longitude sensing device has 180° raised portion and 180° lowered portion.

FIGURE 6 shows the electrical circuiting operated by microswitches 251 and 251*x*. The step-by-step transmitters 260 and 261 are arranged to convert into electrical analogue outputs, the North-South, East-West miles travelled analogues incoming from differentials 172 and 192 and to electrically operate latitude and longitude repeaters 300, 300*a*. The microswitches 251 and 251*x* of the sensing counters operate two relays 263 and 264. In FIGURE 6, for the sake of convenience, the relays have been separated from the contacts which they operate. The relay 264 operates switch 264*b* between contacts 264*a* and 264*c*, and the switch 264*y* between the contacts 264*x* and 264*z*. Relay 263 operates switch 263*b* between contacts 263*a* and 263*c* and switch 263*y* between contacts 263*x* and 263*z*.

When the aircraft is flying in the northern hemisphere the lamp indicator 270 on a panel at the navigator's station will be illuminated since the switch 251 will have been closed against contact 251*a*. If the aircraft's course takes it across the equator into the southern hemisphere the riser 255 will actuate the switch 251 since the incoming information on shaft 226 of the latitude sensing counter 220 will show that the equator has been crossed. The closing of the switch 251 causes it to break contact 251*a* and close contact 251*b*. This has the effect of cutting out the indicator lamp 270 and illuminating the south indicator lamp 271, at the same time energizing relay 264 which closes the switches 264*b* and 264*y* against contacts 264*c* and 264*z*. This has the effect of reversing the latitude transmitter 261 so that the output to the receiving motor 261*r* is in the opposite sense or minus north miles. Therefore the counter 220 now proceeds to read in degrees of south latitude.

Similarly with the longitude counter the switch 251*x* is closed by the raised portion of the cam 251*x* in the longitude counter when flying (say in the western hemisphere) and on passing the international date line the lower portion of the cam 250 is suddenly brought into position over the switch 251*x* which is thus not closed. This causes the west indicator lamp 280 to be switched out and the easterly indicator lamp 281 to be lighted. Relay 263 is also energized and switches 263*b* and 263*y* are caused to break contacts 263*a* and 263*x* and make contacts 263*c* and 263*z* which causes the reversal in sense of the output to the receiving motor 260*r*. This then causes the longitude counter to read down from 180°.

*Latitude and longitude memory devices*

Referring now to FIGURE 3, it will be noted that a latitude memory generally indicated as 190 and a longitude memory generally indicated as 190*a* is provided. Dealing firstly with the latitude memory 190, the analogue of North-South miles which is also analogous to the latitude is transmitted from the gear box 120 to a plurality of differentials 130, 171 and 172. The differentials are mechanically coupled together as shown diagrammatically in FIGURE 3 and schematically in FIGURE 4. The difference shaft 174 of the differential 171 is connected through gearing with the latitude memory 190. Solenoid operated brakes 175, 176 and 177 are provided on the difference shaft 174, the mechanical transmission connection 178 and on the difference shaft 179 of the differential 172. In the normal operation of the computer the solenoid brakes 175 and 177 are in braking engagement with the shafts 174 and 179. Thus information received from shaft 109 is transmitted directly through differential 171, mechanical coupling 178, and differential 172, gear box 261*g*. The information is converted into an electrical analogue by step-by-step transmitter 261 and transmitted on conductor 200 to a remote latitude repeater 300.

When the latitude memory 190 is to be brought into operation, that is to say, when the "North-South" or latitude miles is to be stored in the memory the operator pushes a remote control switch (not shown) which actuates solenoid brake 176 so as to lock the mechanical coupling 178 between the differentials 171 and 172. The analogue information received from the gear box 120 is thus fed to the differential 171 and through its difference shaft 174 to the latitude memory device 190 where the information is stored.

During this operation no information is transmitted to the step-by-step transmitter 261.

The navigator may obtain an accurate position "fix" and desire to reset the remote latitude repeated to the correct latitude. He first actuates the latitude memory device 190 and then operates remote switches to release the brake 177 from shaft 179 and cause the motor 185 to set in the necessary analogue correction to the remote latitude repeater through shaft 179, differential 172 and step-by-step transmitter 261. The correction analogue is also transmitted by mechanical connection 179*a* to differential 130, and thence through gear box 221 to a counter 222, and through gear box 131 to the resolver 141.

Since longitude is a function of latitude it is desirable to correct the latitude first (in cases where latitude and longitude cannot be corrected simultaneously) thereby causing the longitude output from the resolver 141 to be brought up to date immediately. When the repeater 300 has been reset to the corrected figure of latitude, the information stored in the latitude memory 190 is then read out from the memory 190 into the computer counter 220 and also to the latitude repeater. In order to achieve this, the operator closes a remote switch which releases the brake 176 on the mechanical connection 178, and closes the solenoid brake 177 to brake the difference shaft 179 of the differential 172. Motor 186 drives the memory device 190 through the gear box 187 so that the change in latitude information stored in the memory device 190 is fed back to the step-by-step transmitter 261 through the shaft 174, the differential 171, the mechanical coupling 178 and the differential 172.

Turning now to the longitude memory device 190*a*, it will be seen that the output from shaft 155 passes in similar manner through differential 191, mechanical connection 193 and differential 192, to a step-by-step transmitter 260 where the mechanical analogue information is converted into electrical form and transmitted on conductor 200*a* to a remote longitude repeater. The mechanical connection 193 is braked by a solenoid brake 176*a* and the difference shaft 194 of the differential 191 is braked by a solenoid operated brake 195. Similarly the difference shaft 198 of the differential 192 is braked by the solenoid operated brake 197.

During normal operation the solenoid brakes 195 and 197 are closed braking the difference shaft 194 of the differential 191 and the difference shaft 198 of the differential 192, the brake 176*a* on the mechanical connection 193 between differentials 191 and 192 being open. Thus the longitude information is transmitted directly through to the step-by-step transmitter 260 and the longitude sensing device. When it is desired to place the longitude section of the computer on "memory" a remote switch (not shown) is closed, the brake 195 is released permitting the shaft 194 to transmit the incoming data to the memory 190*a*, the brake 197 is opened and the brake 176*a* is closed braking the mechanical connection 193 between the differentials 191 and 192.

To reset the remote longitude repeater the navigator operates remote switch means to release brake 197 and operate the motor 196 to set in through gear box 199, shaft 198 and differential 192 the necessary analogue correction. This information is transmitted as an electrical analogue by the step-by-step transmitter 260 to the output conductor 200*a* and thus to the remote repeater. When the resetting has been completed the brake 176*a* is released and the brake 197 applied, the motor 203 then driving the memory device 190*a* to feed the data stored in the memory 190*a* back through the shaft 194, the differential 191, the mechanical connection 193 and the differential 192 to the step-by-step transmitter 260.

The longitude output on the shaft 155 may be mechanically taken off through gear box 206 and fed by step-by-step transmitter 207 to any other navigating device in the aircraft which requires an analogue of change in longitude as input, for example, to a tactical computer as described in the Wright et al. copending application Serial No. 792,519.

The change in latitude information from shaft 109 may be taken off the differential 130 through the cone gears 134 of the gear box 131 and transmitted to a counter through a gear box 221, so that the computer itself may have a latitude counter 220.

FIGURES 10, 11, 12 and 12*a* show the mechanical arrangement of the memory devices 190 and 190*a*. The devices are identical, thus for the sake of brevity reference will be made only to the latitude memory 190. The data from shaft 174 is stored in the memory by rotating the shaft 340 which is coupled to the gear 326 by a coupling device 326A. The gear 326 has a skirt 328 integral therewith and provided on its periphery with a slot 330. The gear 326 meshes with a cylindrical pinion gear 325 mounted for rotation in the frame of the device 190. The pinion gear 325 in turn drives two further gear wheels 327, 321 which are mounted for independent rotation on the shaft 340. Each of the gears 327, 321 is provided with a skirt 329, 322 respectively. The skirts 329, 322, have radial slots 331, 323 in their periphery. These slots are similar to the slot 330 in the skirt 328 and the gear 327 is formed with one less tooth than the gear 326, whilst the gear 321 has one more tooth than the gear 326.

When not in use the memory device will rest as shown in FIGURE 11 with the slots 330, 331, and 323 aligned and with the pawls 337, 338 and 339 engaged therein.

When it is desired to actuate the memory device a remote switch is pushed releasing the brake 175 on the shaft 174 (FIGURE 3) and shaft 340 is then rotated in accordance with the incoming analogue information on shaft 174. The gear 326 is driven and its slot 330 draws the pawls out of engagement with the slots rotating them on shaft 335. At the same time the pinion 325 rotates the gears 327, 321 and the memory device stores the incoming analogue information.

On the pawl shaft 335 there is a pin 336 which contacts one or other of the micro switches 341 or 342 depending upon the sense of rotation of the pawl shaft 335. When the storing of information in the memory device is complete and it is desired to read out the information stored therein a motor 186 is energized and it drives the shaft 340 in the required sense (previously detected by the particular micro switch 341 or 342) and reads out the information until the slots 330, 331 and 323 are again aligned permitting the pawls to fall into place and open the micro switch 341 or 342 depending upon which one has been closed. It will be seen from FIGURE 3 that electrical connections are provided to release the brake 175 on the shaft 174 when the motor 186 is actuated. Now the opening of the micro switch 341 or 342 stops the motor 186 and also releases the solenoid brake 175. As will be more clearly seen with reference to the identical memory device 190*a* in FIGURE 4 a disc 400 is provided on an extension of the memory shaft and the solenoid operated brake 175 identical with the brake 195 is provided on the outer end of its armature with a cone-shaped projection, whilst the disc 400 is provided with a cone-shaped indentation to receive the armature projection. Thus as the pawls of the memory engage in their respective slots and open the micro switch the associated driving motor for the memory is stopped and an instantaneous braking is obtained by the release of the armature of the associated solenoid brake. This action immediately stops any inertial rotation by the memory gear wheels and thus the pawls are not urged involuntarily out of engagement to make one of the micro switches and cause "hunting" of the memory.

What we claim as our invention is:

1. Apparatus for processing aircraft navigational information comprising a first ball resolver; angular and linear input shafts to the ball resolver adapted to apply respectively the analogues of aircraft true track and ground miles travelled along the aircraft track; sine and cosine output shafts for said resolver adapted to take-off respectively the analogues of change in "East-West miles" and change in "North-South miles" components of ground miles travelled; a second ball resolver; angular input shaft means for applying as an input the said "North-South miles" component to said second ball resolver, the cosine output shaft of the second ball resolver being adapted as an input shaft means to apply to said second ball resolver the analogue of the said "East-West miles" co-ordinate component; the sine output shaft of the second ball resolver taking off from said second ball resolver the analogue of change in convergency and the linear input shaft of said second ball resolver being adapted to take-off as an output from the second ball resolver the analogue of change in longitude and memory means in operative connection with the cosine output shaft of the first ball resolver and with the longitude take-off shaft of the second resolver.

2. Apparatus as claimed in claim 1, further comprising servo drive means for the longitude analogue output shaft adapted to drive said shaft in response to an error signal derived from the angular difference between the cosine output shaft of the second ball resolver and the sine output shaft of the first ball resolver.

3. Apparatus for processing aircraft navigational information comprising: first resolving means; means for setting into said resolving means as first and second inputs thereto the analogue of air craft true track and the analogue of ground miles travelled along aircraft track; sine and cosine output means for said first resolving means adapted to take-off in analogue form sine and cosine functions of the resolution; second resolving means; means for setting into said second resolving means first and second inputs thereto the sine and cosine resolution analogues from the first resolving means; sine and cosine output means for said second resolving means adapted to take-off respectively therefrom the analogue of change in longitude and the analogue of change in convergency of meridians; servo drive means for the longitude analogue output means adapted to drive said means in response to an error signal derived from the difference between the said cosine output shaft of the second resolving means component input shaft and the sine output shaft of the first resolving means, the said cosine output shaft for the first ball resolver and the said shaft adapted to take-off the change of longitude from the second ball resolver being operatively associated with means comprising: Mechanical transmission means for transmitting as an input to a differential gear; a further differential gear adjacent the first mentioned differential gear; mechanical means coupling the differentials in series; difference shafts on both said differential gears at right angles to the other shafts of the differentials; solenoid-operated brake means for each of said difference shafts and for his mechanical coupling means; a memory device mechanically coupled to said difference shaft of said first mentioned differential gear; means for applying to said difference shaft of said further differential a correction analogue; and means for selecting the actuation of the said three brakes whereby to permit of the following conditions:

(a) the difference shaft of the further differential and the mechanical coupling between said first mentioned and further differentials braked and said difference shaft of said first mentioned differential free, wherby to permit the analogue information input to said first mentioned to be stored in said memory device;

(b) said mechanical coupling between said first mentioned and further differentials braked, said difference shaft from said first mentioned differential free and said difference shaft of said further differential free whereby to permit of the super imposition of a correction analogue to said further differential through its difference shaft during operation of the memory device;

(c) said difference shaft from said further differential braked said mechanical coupling free, and said difference shaft from said first mentioned differential free whereby to permit of a "read-out" of said information stored in said memory device;

(d) said difference shafts from said differentials braked and said mechanical coupling free whereby to transmit analogue information from the said mechanical transmission means through said differentials.

References Cited by the Examiner

UNITED STATES PATENTS

| | | | |
|---|---|---|---|
| 1,508,121 | 9/24 | Olsen | 235—103 |
| 1,608,606 | 11/26 | McNab | 235—103 |
| 2,765,116 | 10/56 | Sobisch. | |
| 2,896,843 | 7/59 | Hunter. | |
| 2,908,902 | 10/59 | Gray et al. | 235—187 X |
| 2,951,639 | 9/60 | McKenney et al. | 235—187 |
| 2,970,767 | 2/61 | Zabb et al. | 235—187 |

MALCOLM A. MORRISON, *Primary Examiner.*

WALTER W. BURNS, Jr., *Examiner.*